Patented Jan. 12, 1932

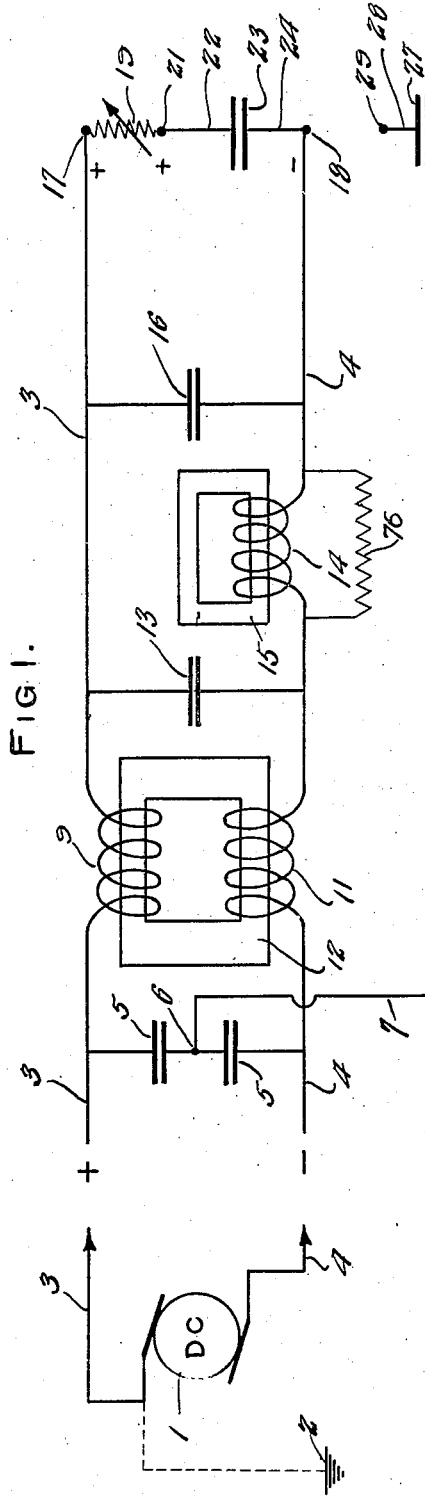
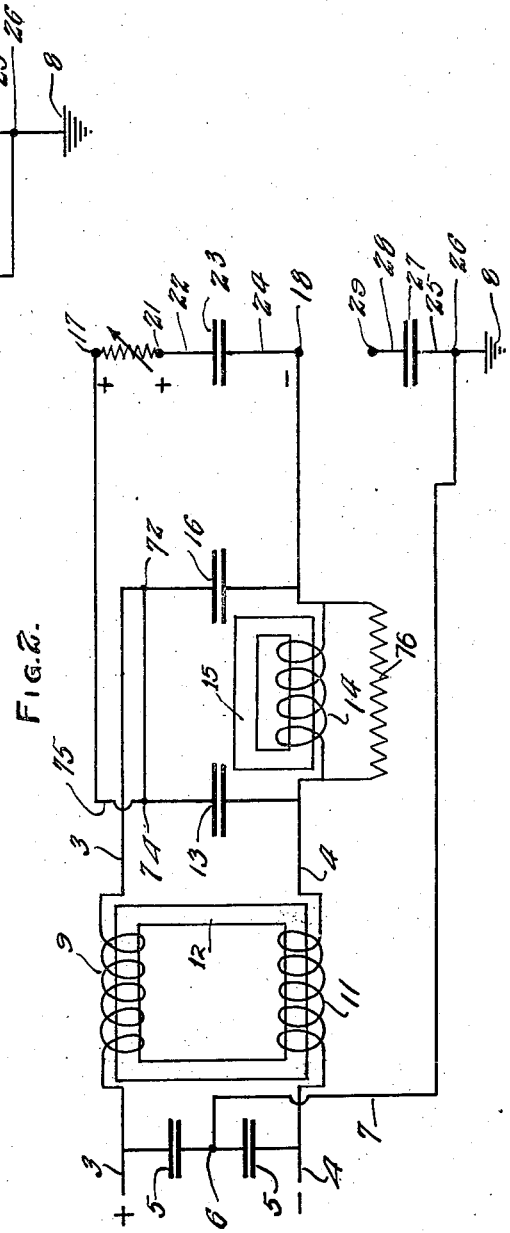

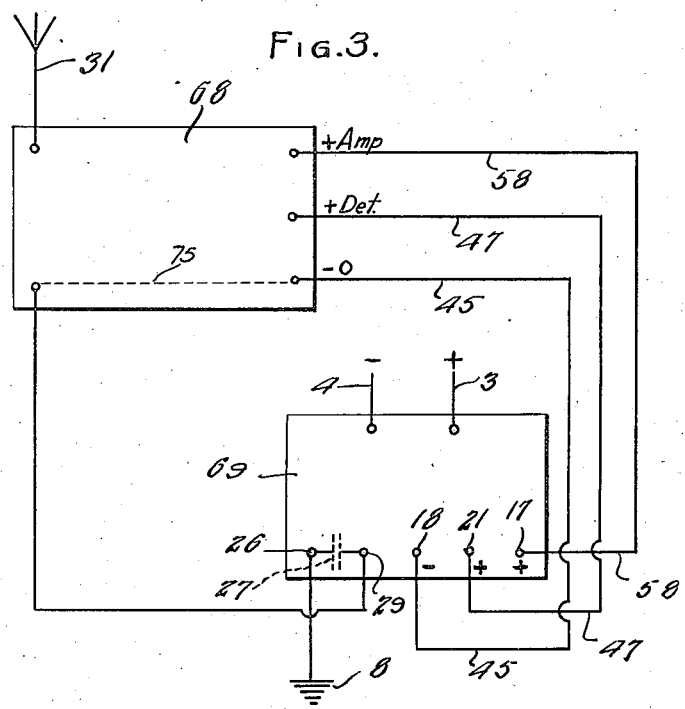
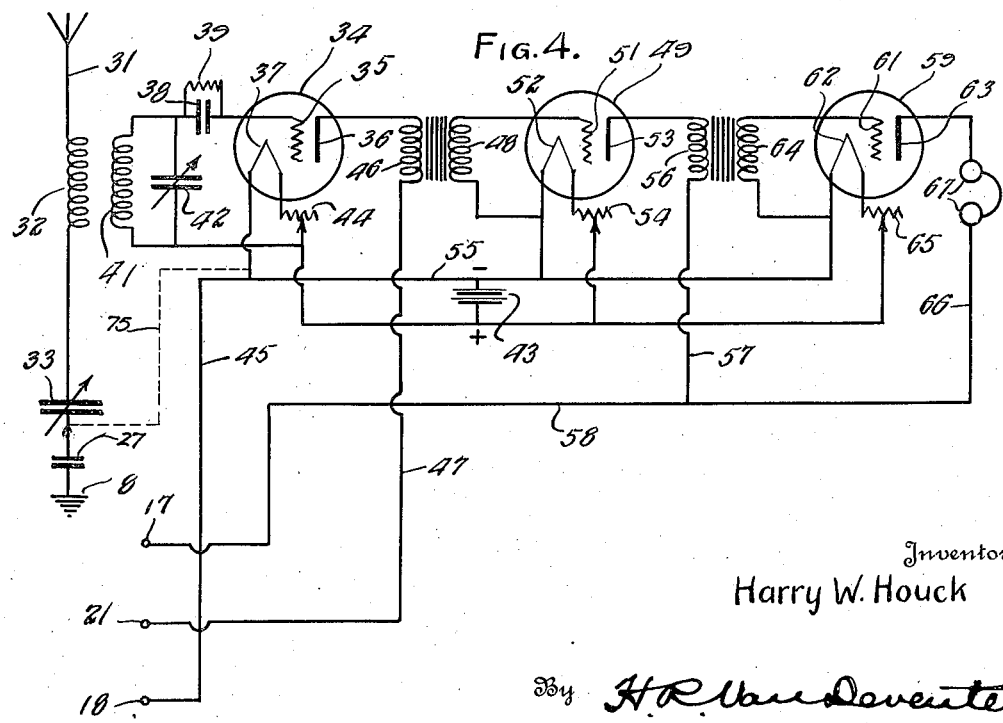

1,840,776

UNITED STATES PATENT OFFICE

HARRY W. HOUCK, OF EAST ORANGE, NEW JERSEY, ASSIGNOR, BY MESNE ASSIGNMENTS, TO DUBILIER CONDENSER CORPORATION, OF NEW YORK, N. Y., A CORPORATION OF DELAWARE

FILTERING ARRANGEMENT FOR DIRECT CURRENT

Application filed October 24, 1924. Serial No. 745,659.

My invention relates to a filtering circuit, and more particularly one to be used in connection with the current supply for a radio set.

An object of my invention is to provide a system which dispenses with the usual battery called the "B" battery to furnish current for the tube plate circuits.

A further object of my invention is to provide a circuit by means of which current from a house lighting system may be used to furnish power to the plate circuits of vacuum tubes.

A still further object of my invention is to provide a circuit arrangement inexpensive to construct, operate, repair or replace, and consisting of few elements.

In ordinary practice, the current is supplied to the plates of vacuum tubes as used in connection with radio sets by means of so called "B" batteries. These batteries entail frequent replacements, depending on the amount of use they receive. They are an added expense to the operation of a radio set, and unless the voltage of the "B" battery is maintained at its proper value, the efficiency of the set is impaired. To overcome the objections to the use of "B" batteries with consequent replacements, I have provided a filtering circuit to be used in connection with radio sets, in which the house lighting system may be used as a source of plate current, thereby eliminating the "B" battery entirely.

I am aware that various systems have been proposed to use the ordinary house lighting current in connection with radio sets, and, particularly for the purpose of eliminating both the primary and the secondary batteries.

Some of these systems are open to the objection that they do not remove all of the fluctuations and disturbances from the current source, and thereby impair the operation of the vacuum tubes.

My invention provides means in circuit with the plate current source which smooths out the generator fluctuations, and other disturbances on the line, and delivers to the terminals of the radio set a smooth continuous current without pulsations.

In the drawings:

Figure 1 is a diagrammatic view of the filtering circuit;

Figure 2 is a diagrammatic view showing a modification of the filtering circuit;

Figure 3 is a diagrammatic view showing the filterng circuit connected with a radio set;

Figure 4 is a diagrammatic view showing the circuits of a radio receiving set, and the terminals across which the "B" battery is usually connected.

Referring to the drawings, and more particularly to Figure 1, I have shown a source of direct current 1 which is grounded at 2, and from which positive current is supplied to a main 3, and negative current is supplied to a main 4. In order to smooth out the fluctuations in the direct current supply, I have interposed filtering or smoothing out means. Connected across the mains 3 and 4 is a condenser 5, or rather a pair of condensers with their middle point 6 connected to a lead 7 which is connected to ground at 8.

A choke coil 9 is connected in series with the positive main 3, and a corresponding choke coil 11 is connected in series with the negative main 4. The choke coils 11 and 9 are wound on the same core 12. A condenser 13 is bridged across the leads 3 and 4 on the opposite side of the choke coils 9 and 11, wound on the single core 12, from the condensers 5. Interposed in the lead 4 is a choke coil 14 wound on a core 15.

On the opposite side of choke coil 14 from the condenser 13 is located a condenser 16 which is bridged across the leads 3 and 4. The lead 3 is provided with a positive terminal 17 which may be under conditions of operation where there is 110 volt direct current supply, at about 90 volts potential. The main 4 is provided with a negative terminal 18 which in the case of the 110 volt supply above referred to, will be at approximately zero volts potential. Connected between terminal 17 and terminal 18 is a variable resistance 19, leading to terminal 21, to which one of the plate circuit terminals of a detector tube, as will be later described, can be connected. Leading from the terminal 21 is a lead 22 to which is connected a condenser 23, which latter is connected through a lead 24 to the terminal 18.

Connected to the lead 7, which is connected at one end to the mid point 6 of the condensers 5 and at the other end to the ground 8, is a lead 25 which joins the lead 7 at a point 26. The lead 25 is connected to one side of a condenser 27, which at its other side is connected through a lead 28 to a terminal 29.

My method of connecting the circuit just described to a radio apparatus, I have illustrated in Figure 4, in which I have shown a radio set having an antenna 31. Comprised in the antenna circuit is a coil 32 and a variable capacity 33, and this circuit is adapted to be connected through the condenser 27, of the circuit just described, to the ground at 8.

I have shown a vacuum tube 34 having a grid element 35, a plate element 36 and filament 37. In accordance with the usual practice, I also show in the grid circuit of the detector tube 34 a grid condenser 38 shunted by a grid leak resistance 39. A coil 41 is coupled to the coil 32 in the antenna circuit, and the coil 41 has connected in parallel therewith a variable condenser 42. The filament 37 is heated by means of an "A" battery 43, the amount of current fed to the filament being controlled by a variable resistance 44.

The filament 37 is connected to a lead 45, that is connected to the terminal 18 of the filtering circuit which, as previously explained, is approximately at zero potential.

Located in the plate circuit of vacuum tube 34 is a winding 46, being the primary of a transformer coil. Through a lead 47 the plate circuit is coupled to the terminal 21 of the filtering circuit, which in case of 110 volt direct current supply would be approximately at a potential of 45 volts. Thus, the plate circuit of the vacuum tube 34, by reason of its coupling to terminals 21 and 18 is supplied with direct current of a voltage of about 45 volts or some other suitable voltage, and any fluctuations in the direct current supply will have been entirely eliminated, so that the current supplied to the plate circuit of the vacuum tube will be steady and without any fluctuations.

Coupled to the coil 46 in the plate circuit of the detector tube 34 is a coil 48 which acts as the secondary of an inter tube transformer. The coil 48 lies in the grid circuit of an amplifier tube 49 having a grid element 51, a filament element 52 and a plate element 53. The filament 52 is heated through "A" battery 43 and the amount of current fed to the filament is controlled through variable resistance 54. The filament 52 is coupled through a lead 55 to the lead 45, which is connected to terminal 18.

The plate element 53 of the detector tube 49 is connected through a coil 56, comprising the primary of an inter tube transformer, and a lead 57, to a lead 58 which is connected to terminal 17 of the filtering circuit. By reason of the connection of the filament 52 to terminal 18 of the filtering circuit and the connection of the plate to the terminal 17 of the filtering circuit, the plate circuit of the amplifier tube 49 is supplied with a current of approximately 90 volts potential in case there is a 110 volt direct current supply to the filtering circuit. This current is without fluctuations and causes the amplifier tube 49 to operate at high efficiency.

In the diagram of circuits which I have shown in Figure 4, I have illustrated a radio set comprising the detector tube 34, the amplifier tube 49, and another similar amplifying tube 59 having connection somewhat the same as the amplifier tube 49. The tube 59 comprises a grid element 61, filament element 62 and a plate 63. The grid circuit is coupled through a coil 64 comprising the secondary of an inter tube transformer, to the coil 56 of the amplifier tube 49. The filament is heated through the same "A" battery 43, and the current supplied to the filament is controlled through a variable resistance 65.

The plate 63 is connected through a lead 66 to the lead 58, and thence to the terminal 17 of the filtering circuit. The filament 62 is connected to the lead 55 and thence to the terminal 18 of the filtering circuit. Hence the plate circuit of the amplifier tube 59 is supplied, as in the case of the amplifier tube 49, with direct current of approximately 90 volts without any fluctuations or disturbances therein. In the plate circuit of the amplifier tube 59 I have placed telephone receivers 67 over which the amplified signals may be received.

In order to make more clear the hook up of such a system, I have diagrammatically illustrated in Figure 3, an apparatus comprising a radio set having the antenna 31. The set, it will be understood, comprises practically the apparatus illustrated in Figure 4, which I have indicated in Figure 3 simply by a square box 68. Leading from the radio set is the lead 45 which connects to the filaments of all of the tubes, the lead 47 which connects to the plate of the detector tube, and the lead 58 which connects to the plates of the amplifier tubes.

The filtering circuit described in connection with Figure 1 I have diagrammatically illustrated by a box 69, into which lead the direct current supply mains 3 and 4. The lead 58 from the plates of the amplifier tubes is connected to the terminal 17 of the filtering circuit. Likewise, the leads 47 and 45 are connected to the terminals 21 and 18, respectively, of the filtering circuit.

The arrangement of filtering means which I have shown in the filtering circuit illustrated in Figure 1 not only eliminates any disturbances or fluctuations in the current supplied by the mains 3 and 4, but I have also provided a means, through the variable resistance 19 connected between the terminals 17 and 21 in the plate circuit of the detector tube, for regulating current supplied to the plate circuit of the detector tube. The variable resistance 19 is such, that through adjustment of the resistance, the amount of current flowing in the plate circuit of the detector tube can be controlled at will.

In Figure 2 I have diagrammatically illustrated a modification of the form of invention illustrated in Figure 1. The lead 3 is connected to one terminal 72 of condenser 16, which is connected to one terminal 74 of the condenser 13, and terminal 17 is connected to terminal 74 through a lead 75. In some instances, I find this type of connection convenient.

I may make the cores for the coils 9, 11 and 14, closed or nearly closed as required. The successive coils and condensers smooth out the current bit by bit to a greater and greater extent, until by the time the current reaches the terminals 17, 18 and 21, it is uniform in strength and the pulsations are entirely removed.

The condenser 23 is simply an extra condenser assisting in the smoothing out of the current between the terminals 21 and 18, to which the detector circuit of the radio receiving set is united.

The condenser 27 is an important feature of the invention and its presence is essential to successful operation.

In practice, a direct current generator such as is indicated at 1 in Figure 1 has its positive terminal connected to ground in a power house, as indicated at 2; and, as already described, the mid-point of the two condensers 5 is also connected directly to ground through the lead 7. Further, the ordinary radio receiving set has a ground connection running from one of the filaments, as indicated at 75 in Figures 3 and 4. The antenna circuit of such a set is through the usual primary coil 32 and adjustable condenser 33 to ground, such as the water pipe of the building in which the set is used. With the filtering arrangement connected to a radio receiving set and the filtering apparatus or arrangement supplied, as shown in Figures 3 and 4, with direct current from the lighting system of a house or building connected to a more or less distant power house, the establishing of a ground connection for the radio receiving set is the same in effect as if the zero-potential terminal of the set, which is joined to the terminal 18 of the filtering and smoothing arrangement, were connected to the lead which runs from the set and goes to the terminal 26 of the case containing the filtering and smoothing out circuits. In the practice of my invention, however, this ground connection for the radio receiving set (indicated at 75, connected as stated to one of the filament terminals) may unite with the ground wire of the antenna, but instead of going directly to the terminal 26, it goes to the terminal 29 of the filtering arrangement, which is separated from the terminal 26 by the condenser 27. Thus the condenser is interposed between ground and the condenser 33, also between ground and the usually grounded terminal of one of the filaments.

Suppose now the condenser 27 were omitted, so that the usual filament terminal of the receiving set were grounded directly. Then, when the filtering and smoothing apparatus is connected to the supply circuit, current would flow from the positive terminal of the generator 1 to ground and through ground to the lead 75, and by way of lead 45 to the terminal 18, and back to the generator through the wire 4 and coils 14 and 11; hence there would be no difference of potential between the plates and filaments of the set and no signals could be obtained.

Suppose also, that, when the owner of the set wishes to use the filtering arrangement, he takes the plug at the end of the usual cord which will connect with the leads to the condensers 5, and inserts the plug into the socket containing the terminals of the wires which lead to the dynamo 1. If, under any circumstances, the connection is reversed so that the wire leading to the coil 9, which should be connected to the positive lead of the generator is accidently connected to the negative lead, and the wire leading to the coil 11, which is on the negative side of the circuit, is united to the positive lead of the generator; and if at the same time anything should happen to short circuit the terminals 17 and 18, the result will be that the current will then flow from the positive lead of the generator 1 to the ground 2, thence by way of the ground lead 75 and conductor 45 to the zero potential terminal 18, then across the assumed short-circuit from terminal 18 to the terminal 17, and thence by way of the coil 9 to the negative lead of the generator. In consequence, the coil 9 would be the only resistance in the circuit and it would heat up very much, possibly causing the melting of a fuse.

With, however, special precautionary means including the condenser 27 in the circuit, as indicated in the drawings, no mishap can occur. On the filtering arrangement being properly connected to the lighting circuit, so that the coil 9 is joined to the positive side of the circuit and the other coils to the negative side, the plates of the set will always have the proper potential to make the set operate; and if the leads should be reversed, and a short-circuit occur at the same time, no damage can take place. If the owner of the apparatus should happen to get the connections from the filtering arrangement to the supply circuit reversed, the device merely will not work for the time being, and all he has to do is to take the plug at the end of the card, connected to the input side of the filtering arrangement out of the socket and insert it in the other way.

I aim as far as possible to make the resistance of the arrangement great enough to prevent a short-circuit from blowing a fuse, in case a short-circuit at the terminals 17 and 18 should occur.

The inclusion of the condenser 27 thus assures a sufficient difference of potential to operate the radio set and it obviates any danger of damage in case the output terminals of the apparatus should be accidentally short-circuited, and the polarity of the input leads reversed at the same time.

While I have not shown and described all forms of my invention, I desire that it shall be limited only by the prior art and the scope of the appended claims; and I reserve the right to make any changes that are not departures from the principle which governs the invention. For example, I may provide an impedance 76 in shunt with the coil 14, or any one of the other two coils, to improve the filtering and prevent oscillations at the frequency of the free or natural period of the circuit.

I claim:—

1. In combination with a radio receiving set, a source of unidirectional power supply having one side normally grounded, a filter connected between said source and the receiving set to smooth out fluctuations in the power supplied to the set, a ground connection for the filter and a terminal connected to the receiving set to provide a ground therefor, and a condenser connected between said terminal and ground connection to prevent a conductive connection between the receiving set and ground.

2. In combination with a radio receiving set, a source of unidirectional power supply having one side normally grounded, a filter connected between said source and the receiving set to smooth out fluctuations in the power supplied to the set, a ground connection for the filter and a terminal connected to the filament circuit of the receiving set, and a condenser connected between said terminal and ground connection to prevent a conductive connection between the filament circuit and ground.

Signed at New York in the county of New York and State of New York this 23rd day of October, A. D. 1924.

HARRY W. HOUCK.